(12) United States Patent
Schumacher et al.

(10) Patent No.: US 8,112,979 B2
(45) Date of Patent: Feb. 14, 2012

(54) CROP LIFTER

(75) Inventors: Friedrich-Wilhelm Schumacher, Eichelhardt (DE); Gustav Schumacher, Eichelhardt (DE)

(73) Assignee: Gebr. Schumacher Geratebaugesellschaft mbH (DE)

( * ) Notice: Subject to any disclaimer, the term of this patent is extended or adjusted under 35 U.S.C. 154(b) by 0 days.

(21) Appl. No.: 12/874,261

(22) Filed: Sep. 2, 2010

(65) Prior Publication Data
US 2011/0047953 A1 Mar. 3, 2011

(30) Foreign Application Priority Data
Sep. 2, 2009 (DE) .................. 10 2009 039 670

(51) Int. Cl.
*A01D 65/02* (2006.01)

(52) U.S. Cl. ........................................................ 56/313

(58) Field of Classification Search ............... 56/1, 10.4, 56/17.3, 17.4, 119, 130, 307, 312, 313, 314, 56/DIG. 20, DIG. 24
See application file for complete search history.

(56) References Cited

U.S. PATENT DOCUMENTS

| | | | | |
|---|---|---|---|---|
| 80,124 A * | 7/1868 | Bonney, Jr. | ..................... | 56/312 |
| 723,084 A * | 3/1903 | Vollborn | ..................... | 56/312 |
| 1,202,084 A * | 10/1916 | Merkel | ..................... | 56/313 |
| 1,846,453 A * | 2/1932 | Pearson | ..................... | 56/314 |
| 2,294,646 A * | 9/1942 | Young | ..................... | 56/313 |
| 3,965,659 A * | 6/1976 | Schumacher et al. | ......... | 56/313 |
| 4,330,984 A * | 5/1982 | Hillmann | ..................... | 56/314 |

* cited by examiner

*Primary Examiner* — Thomas Will
*Assistant Examiner* — Joan Misa
(74) *Attorney, Agent, or Firm* — Harness, Dickey & Pierce, P.L.C.

(57) ABSTRACT

A crop lifter for a mower of a harvesting machine with at least one mowing finger (2) has a carrier rail (5) and a stalk lifter (8). A first end (6) of the carrier rail (5) can be fixed to the mower. The stalk lifter (8) is connected to a second end (7) of the carrier rail (5). The stalk lifter (8), together with the carrier rail (5), encloses an acute angle.

7 Claims, 3 Drawing Sheets

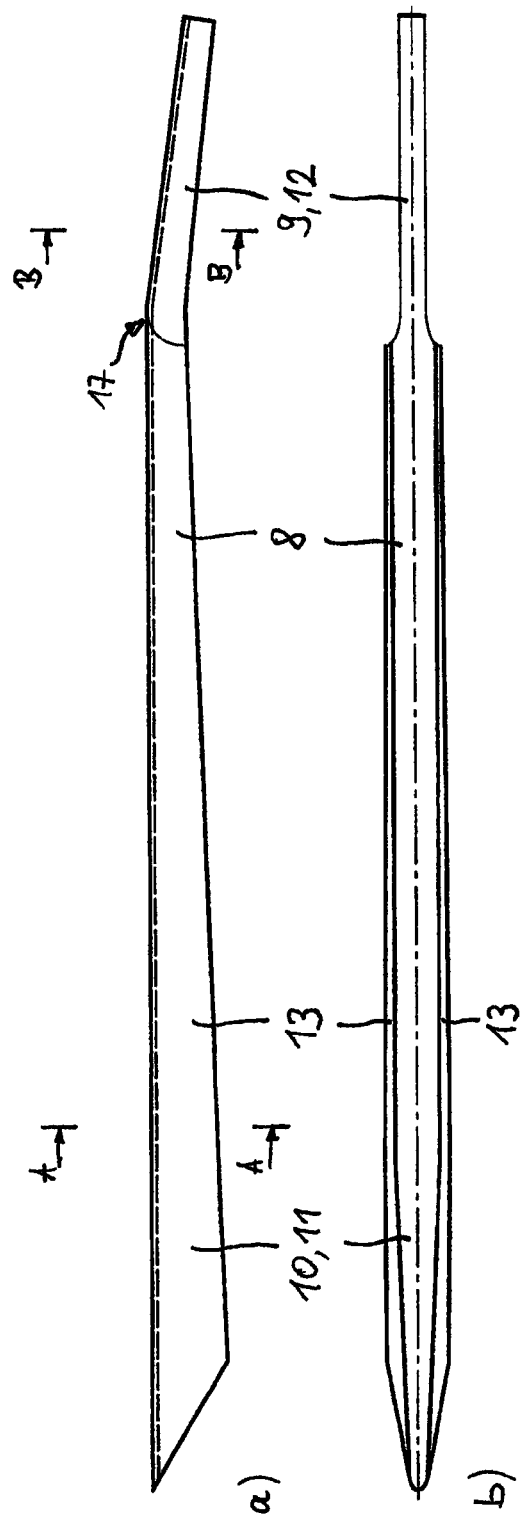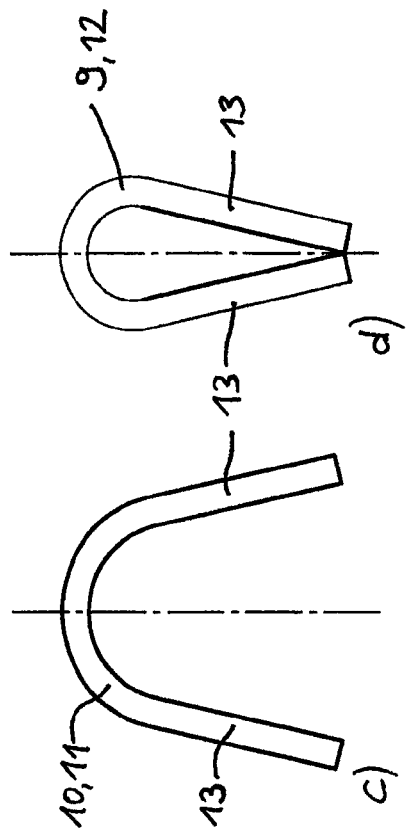
Fig. 2

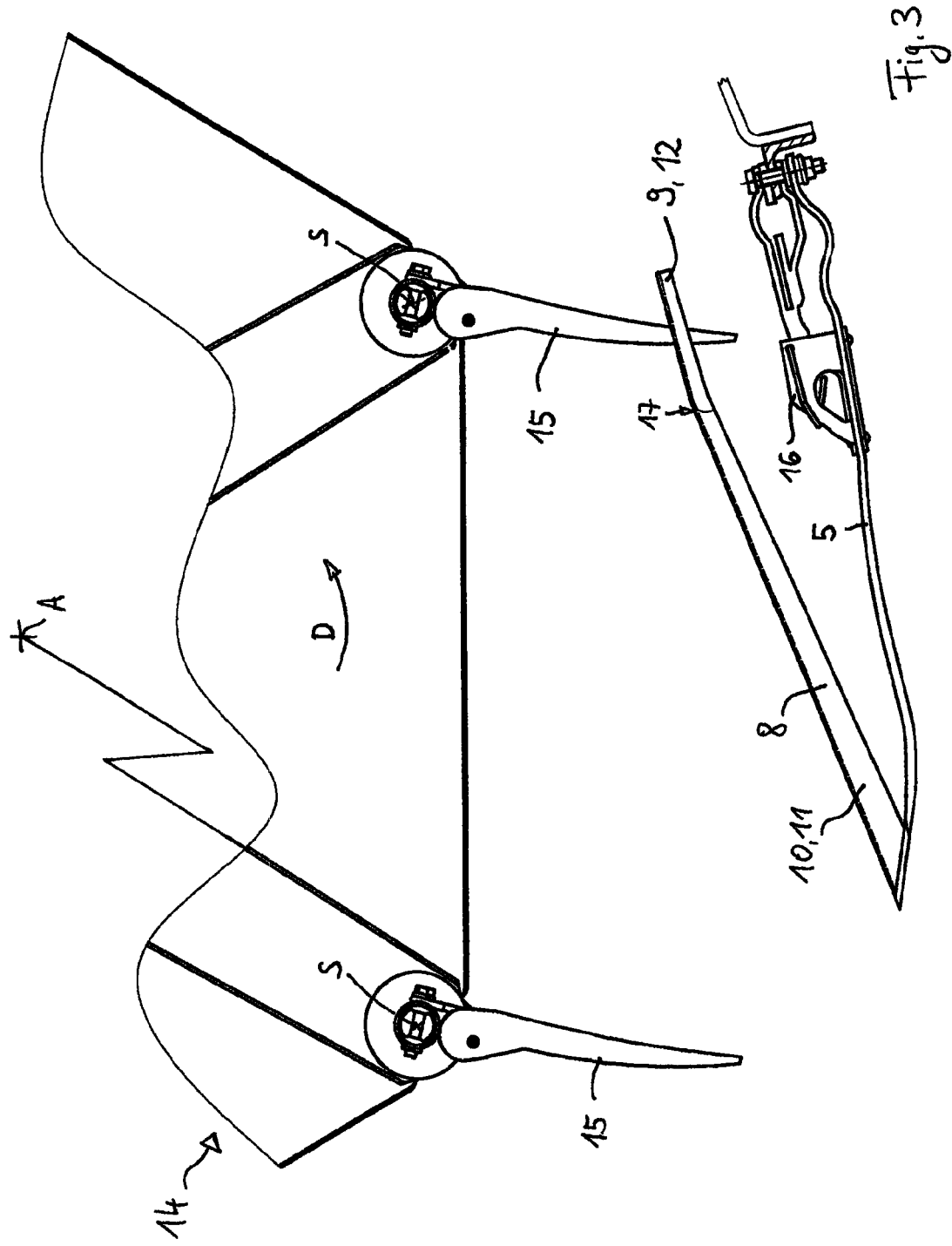

CROP LIFTER

CROSS-REFERENCE TO RELATED APPLICATION

This application claims priority to German Patent Application No. 102009039670.5-23 filed Sep. 2, 2009, which application is herein expressly incorporated by reference.

FIELD

The disclosure relates to a crop lifter for a mower of a harvesting machine with at least one mowing finger. The crop lifter includes a carrier rail with a first end that can be fixed to the mower. A stalk lifter is connected to a second end of the carrier rail. The stalk lifter and the carrier rail enclose an acute angle.

BACKGROUND

The front part of the carrier rail is fixed with the stalk lifter to enable the crop lifter to slide across the ground or moves just above the ground. The stalk lifter lifts up any stalks of the material to be harvested so that the material can be cut off by the cutters of the mower. Thus, the crops can be fed into a thresher for example.

A crop lifter is shown in DE 23 25 916. It has a stalk lifter with a U-shaped profile over its entire length. The arms of the U-shaped profile start from the weld between the stalk lifter and the carrier rail. The length of the arms decreases towards the free end of the stalk lifter.

In the case of continuously U-profile-shaped stalk lifters according to the prior art, interlocking between the U-profile and the reel tines of a reel, operated in reverse, constitute a regular problem. Here, the reel tines are caught in the U-profile and may bend the stalk lifter relative to the carrier rail.

SUMMARY

It is therefore an object of the present disclosure to provide a crop lifter where the stalk lifter is less likely to vibrate. Additionally, when the reel is operated in reverse, the stalk lifter is less likely to run the risk of being damaged by the reel tines.

A crop lifter is provided for a mower of a harvesting machine with at least one mowing finger. The crop lifter comprises a carrier rail with a first end that can be fixed to the mower. A stalk lifter is connected to a second end of the carrier rail. The stalk lifter, together with the carrier rail, encloses an acute angle. A first portion of the stalk lifter faces the carrier rail. The first portion has a profile part, viewed in cross-section, that is U-shaped. A second portion of the stalk lifter faces away from the carrier rail. The second portion, when viewed in cross-section, has a tubular-shaped profile part.

Since the stalk lifter includes both a U-shaped profile and a tubular profile, it is possible to advantageously achieve an interruption in the vibration amplitude of the stalk lifter. This contributes towards calming the internal vibrations of the stalk lifter. Furthermore, the closed and slim shape of the stalk lifter, achieved by the tubular profile part, reduces the risk of collisions between the stalk lifter and the reel tines during the forward operation of the reel. When reversing the reel, the risk of interlocking between the stalk lifter and the reel tines is effectively eliminated or at least greatly reduced.

The two portions of the stalk lifter are generally produced in one piece. The stalk lifter is provided in the form of a formed sheet metal part. An advantage of this is simple and cost-effective production process.

The second portion is arranged in an end region of the stalk lifter, the risk of a collision and, respectively, the risk of interlocking between the stalk lifter and the reel tines are particularly effectively reduced.

The first portion of the stalk lifter is connected to the carrier rail. The first portion is in the form of a U-profile. Thus, it is possible, via a weld for example, to be provided on both the inside and the outside of the U-profiles towards the carrier rail. This achieves a particularly stable connection. However, other connecting techniques are also conceivable.

The two portions of the stalk lifter enclose an angle that opens towards the carrier rail. It is possible to reduce the height up to which the grain is lifted by flattening the gradient of the stalk lifter in its end region. The grain is thus lifted up to a height at which the reel tines of the reel act less aggressively on the grain. This reduces the risk of an early and undesirable threshing by the reel.

The carrier rail can be connected to the mowing finger by a fixing mechanism. A transition region of the two portions of the stalk lifter, in the operating position of the crop lifter, is positioned above the fixing mechanism with reference to a horizontal line.

Further areas of applicability will become apparent from the description provided herein. The description and specific examples in this summary are intended for purposes of illustration only and are not intended to limit the scope of the present disclosure.

DRAWINGS

A preferred embodiment of the disclosure is illustrated in the drawings wherein

FIG. 2(a) is a side evaluation view of the stalk lifter of the crop lifter according to FIG. 1.

FIG. 2(b) is a plan view from below into the U-profile of the stalk lifter of the crop lifter according to FIG. 1.

FIG. 2(c) is a cross-section view along line A-A according to FIG. 2a of the stalk lifter of the crop lifter according to FIG. 1.

FIG. 2(d) is a cross-section view along line B-B according to FIG. 2(b) of the stalk lifter of the crop lifter according to FIG. 1.

FIG. 3 is a side elevation view of the crop lifter according to FIG. 1 and a reel with reel tines.

DETAILED DESCRIPTION

Figure 1:
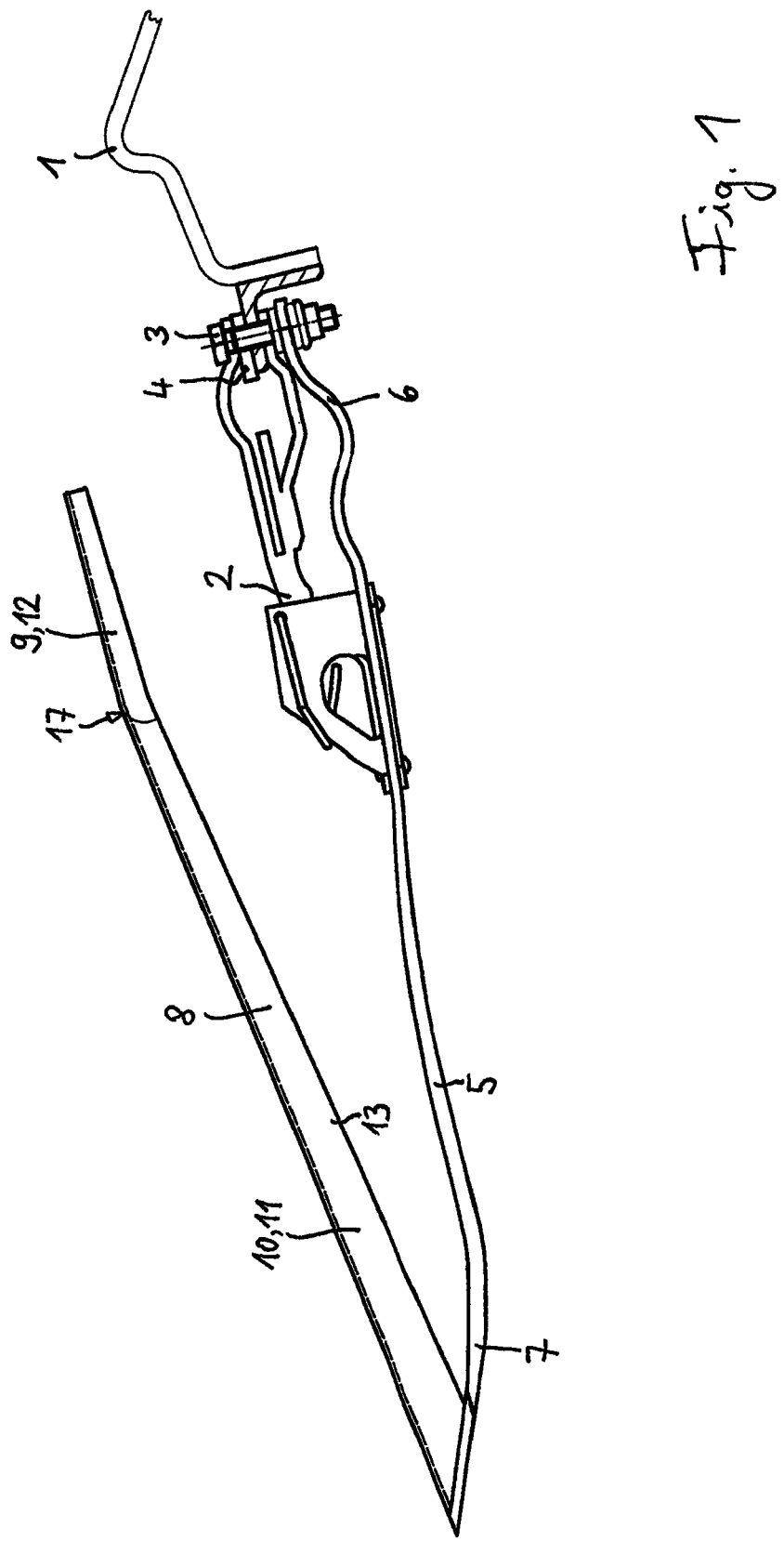
FIG. 1 is a side elevation view of a crop lifter fixed to a mower cutter bar and a mowing finger of a harvesting machine.

FIG. 1 is a diagrammatic illustration of a mower cutter bar 1 with a mowing finger 2 in a projecting position. The mowing finger 2 is fixed by a bolt 3 to the mower bar 1. Several further mowing fingers 2 are associated with the mower bar 1. The fingers 2, are arranged at a distance from one another and project out of and, respectively into, the drawing plane. The mowing fingers 2 serve to guide a cutter bar 4 that includes mower blades for separating the material to be harvested. The first end 6 of a carrier rail 5 can be fixed to the mower bar 1 via the bolt 3, for example. The carrier rail 5 is preferably produced from a flat material that has bending-elastic properties. The carrier rail 5 is supported on the mowing finger 2 via a fixing mechanism in the form of a holding device 16. The holding device 16 is connected to the carrier rail 5 by rivets for example.

At the second end 7, removed from the first end 6, a stalk lifter 8 is fixed to the carrier rail 5. The stalk lifter 8 extends at an angle relative to the carrier rail 5 so as to rise towards the mower bar 1. The carrier rail 5 and the stalk lifter 8 enclose an acute angle. The carrier rail 5 and the stalk lifter 8 can be connected by a weld for example.

The stalk lifter 8 includes a U-shaped profile part 11 and a tubular profile part 12. The stalk lifter portion 9 that faces away from the portion fixed with the carrier rail 5 is formed with the tubular profile part 12. The stalk portion 10 that faces and is fixed with the carrier rail 5 includes relatively wide arms 13 that are tapered towards the tubular profile part 12. The wide arms 13 at the fixing end provide an advantageous span to achieve a firm welded connection with the carrier rail 5. The U-shaped profile part 11 changes into the tubular part 12 in a transition region in the form of a kink 17. Thus, it encloses an angle that opens towards the carrier rail 5.

In FIG. 2c, the two arms 13 of the U-shaped profile part 11 spread away from one another. This ensures that, during the operational process, dirt cannot collect in the U-profile. If dirt accumulates between the two arms 13, the dirt can be easily removed. It is also possible to propose that the two arms 13 of the U-shaped profile 11 may extend parallel to one another.

FIGS. 2b and 2d illustrate portion 9 of the stalk lifter 8 formed into a tubular profile part 12. The easiest way to achieve this is for the two arms 13, of the initially U-shaped profile, to be bent so as to extend towards one another. As a result, the drop-shaped cross-section shown in FIG. 2d is achieved. Alternatively, the drop-shaped cross-section is formed into a round or approximately round cross-section, which is not shown here.

FIG. 3 shows the crop lifter with the stalk lifter 8 and a part of a reel 14 with reel tines 15. The tines 15 are in a spatial arrangement in the operating position relative to one another. The reel 14 can be rotated forward around the axis of rotation A in the drawn-in direction D. In this direction of rotation D, the reel 14 feeds the harvested material towards the processing stage. Rotating the reel 14 in the direction opposite to the direction of rotation D is referred to as reversing. The reel 14 is shown to have reel tines that are held so as to be pivotable around pivot axes S.

The spatial arrangement of the stalk lifter 8 and of the reel tines 15 is such that the stalk lifter 8 is positioned in the drawing plane and that the reel tines 15 are arranged at a short distance behind the stalk lifter. The tines 15 are positioned behind the drawing plane. Again at a short distance behind the reel tines 15, a further crop lifter (not shown) with a stalk lifter is arranged. Thus, the reel tines 15 move through a distance, if viewed perpendicularly relative to the drawing plane, between two stalk lifters 8 which distance is slightly greater than the width of the reel tines, again if viewed perpendicularly to the drawing plane. A problem with this type of operation is that any vibrations of the implement or even a slightly laterally bent reel tines 15 or stalk lifter 8 have an effect of the reel tine(s) 15. Thus, with the tines 15 no longer accurately aligned with the distance between the stalk lifters 8, the reel tines 15 hit the stalk lifter 8. This is totally undesirable. It is particularly undesirable during reversing of the reel 14. Reversing can lead to a reel tines 15 interlocking with the stalk lifter 8. If this occurs, bending of the stalk lifter relative to the carrier rail occurs. This can cause the entire machine to stop.

As seen in FIG. 2b, the present disclosure proposes that the portion 9 facing away from the carrier rail 5 is formed into a tubular profile part 12. Thus, the distance in this region between the two stalk lifters 8 is increased. Accordingly, in both directions of rotation of the reel 14, the risk of a collision between the reel tines 15 and the stalk lifter 8 is at least reduced. In addition, during the reversing operation of the reel 18, any interlocking between a reel tine 15 and a stalk lifter 8 is almost eliminated. This is particularly obvious if FIGS. 2c and 2d are compared with one another. In contrast to a downwardly opening U-profile (FIG. 2c), the closed tubular profile (FIG. 2d) in portion 9 of the stalk lifter 8 offers the reel tines 15 a clearly reduced surface of attack for any kind of interlocking.

Furthermore, it is possible to see that, in the operating condition of the crop lifter with reference to a horizontal line, the transition region, in the form of the kink 17, where the U-shaped profile part 11 changes into the tubular profile part 12 is positioned above or approximately above the holding device 16.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A crop lifter for a mower of a harvesting machine with at least one mowing finger comprising:
    a carrier rail with a first end to be connected with the mower;
    a stalk lifter connected to a second end of the carrier rail, the stalk lifter together with the carrier rail encloses an acute angle;
    a first portion of the stalk lifter extends from the carrier rail, the first portion of the stalk lifter has a profile part, viewed in cross-section, that is U-shaped; and
    a second portion of the stalk lifter, unitarily formed and continuous with the first portion, is spaced away from the first portion extending from the carrier rail, the second portion of the stalk lifter, when viewed in cross-section, has a tubular-shaped profile part.

2. The crop lifter according to claim 1, wherein the first and second portions of the stalk lifter are produced in one piece.

3. The crop lifter according to claim 1, wherein the stalk lifter is made of sheet metal.

4. The crop lifter according to claim 1, wherein the second portion of the stalk lifter is arranged in an end region of the stalk lifter.

5. The crop lifter according to claim 1, wherein the first portion of the stalk lifter is connected to the carrier rail.

6. The crop lifter according to claim 1, wherein the first and second portions of the stalk lifter enclose an angle that opens towards the carrier rail.

7. The crop lifter according to claim 1, wherein the carrier rail can be connected to the mowing finger via a fixing mechanism and in an operating position of the crop lifter, a transition region of the first and second portions of the stalk lifter is positioned above the fixing mechanism with reference to a horizontal line.

* * * * *